US011239951B2

United States Patent
Bae et al.

(10) Patent No.: US 11,239,951 B2
(45) Date of Patent: Feb. 1, 2022

(54) METHOD FOR TRANSMITTING OR RECEIVING WIRELESS SIGNAL IN WIRELESS COMMUNICATION SYSTEM AND APPARATUS THEREFOR

(71) Applicant: LG ELECTRONICS INC., Seoul (KR)

(72) Inventors: Duckhyun Bae, Seoul (KR); Yunjung Yi, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 80 days.

(21) Appl. No.: 16/761,790

(22) PCT Filed: Nov. 12, 2018

(86) PCT No.: PCT/KR2018/013707
§ 371 (c)(1),
(2) Date: May 5, 2020

(87) PCT Pub. No.: WO2019/093840
PCT Pub. Date: May 16, 2019

(65) Prior Publication Data
US 2020/0336248 A1    Oct. 22, 2020

Related U.S. Application Data

(60) Provisional application No. 62/584,115, filed on Nov. 10, 2017.

(51) Int. Cl.
*H04L 1/08*    (2006.01)
*H04L 1/18*    (2006.01)
*H04L 1/22*    (2006.01)

(52) U.S. Cl.
CPC .............. *H04L 1/08* (2013.01); *H04L 1/1812* (2013.01); *H04L 1/22* (2013.01)

(58) Field of Classification Search
CPC . H04L 1/08; H04L 1/1812; H04L 1/22; H04L 5/0094; H04L 5/0055; H04L 1/1864; H04L 1/1822; H04L 1/1819; H04L 1/189
See application file for complete search history.

(56) References Cited

U.S. PATENT DOCUMENTS

2017/0272211 A1*  9/2017  Chen .................. H04L 1/189
2017/0288817 A1* 10/2017  Cao ................... H04L 1/1819
(Continued)

FOREIGN PATENT DOCUMENTS

| KR | 20090043414 | 5/2009 |
| KR | 101260348 | 5/2013 |

OTHER PUBLICATIONS

PCT International Application No. PCT/KR2018/013707, International Search Report dated March 6, 2019, 3 pages.
(Continued)

*Primary Examiner* — Hassan Kizou
*Assistant Examiner* — Abdullahi Ahmed
(74) *Attorney, Agent, or Firm* — Lee, Hong, Degerman, Kang & Waimey PC

(57) ABSTRACT

The present disclosure discloses a method for controlling transmission power in a wireless communication system and an apparatus therefor. Specifically, in a method for performing repetition transmission of a wireless signal by a terminal in a wireless communication system, the method comprises receiving a configuration of multiple resources for repetition transmission of the wireless signal semi-statically by a base station; wherein a redundancy version sequence for repetition transmission of the wireless signal is pre-configured, performing repetition transmission of the wireless signal
(Continued)

based on the redundancy version sequence on the remaining resources except for at least one particular resource among the multiple resources; and performing repetition transmission of the wireless signal on the at least one particular resource based on a redundancy version value pre-configured for the at least one particular resource.

15 Claims, 11 Drawing Sheets

(56) References Cited

U.S. PATENT DOCUMENTS

| | | | | |
|---|---|---|---|---|
| 2018/0123765 | A1* | 5/2018 | Cao | H04L 1/1893 |
| 2019/0021097 | A1* | 1/2019 | Li | H04W 72/0413 |
| 2019/0082450 | A1* | 3/2019 | Ying | H04W 72/1268 |
| 2019/0097762 | A1* | 3/2019 | Jeon | H04W 28/04 |
| 2019/0246378 | A1* | 8/2019 | Islam | H04W 72/042 |
| 2020/0186306 | A1* | 6/2020 | Sun | H04L 1/0041 |

OTHER PUBLICATIONS

ZTE et al, "Remaining Details of UL Transmission without Grant," 3GPP TSG RAN WG1 Meeting 90bis, R1-1717442, Prague, CZ, Oct. 9-13, 2017, 8 pages.

Intel Corporation, "UL data transmission procedures in NR," 3GPP TSG RAN WG1 Meeting 90bis, R1-1717396, Prague, Czech Republic, Oct. 9-13, 2017, 12 pages.

LG Electronics Inc., "Discussion on UL data transmission procedure," 3GPP TSG RAN WG1 90bis, R1-1717968, Prague, CZ, Oct. 9-13, 2017, 12 pages.

* cited by examiner

[FIG. 1]
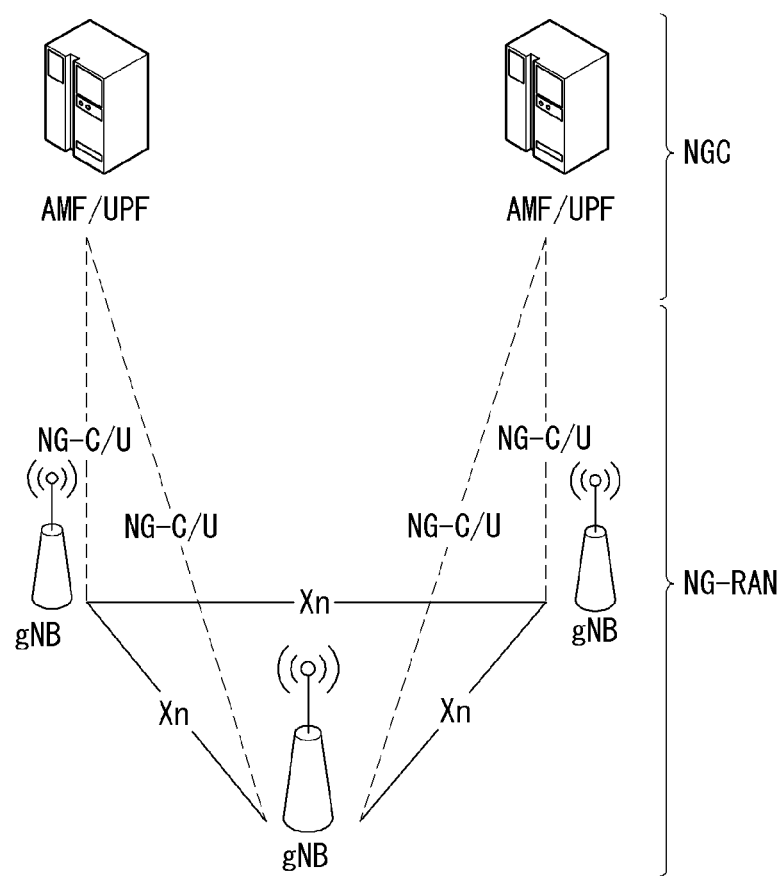

[FIG. 2]
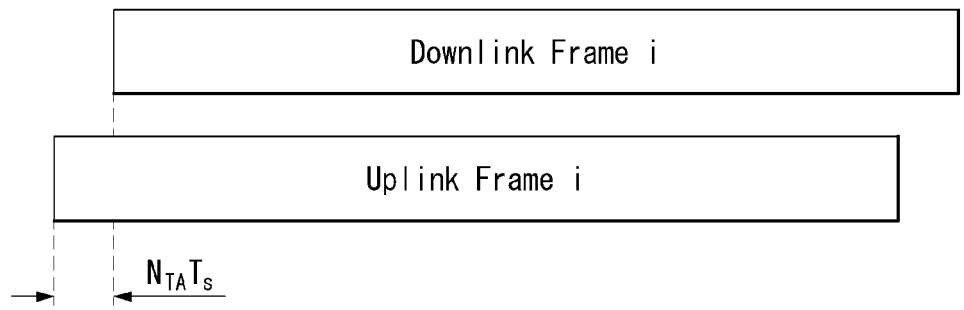

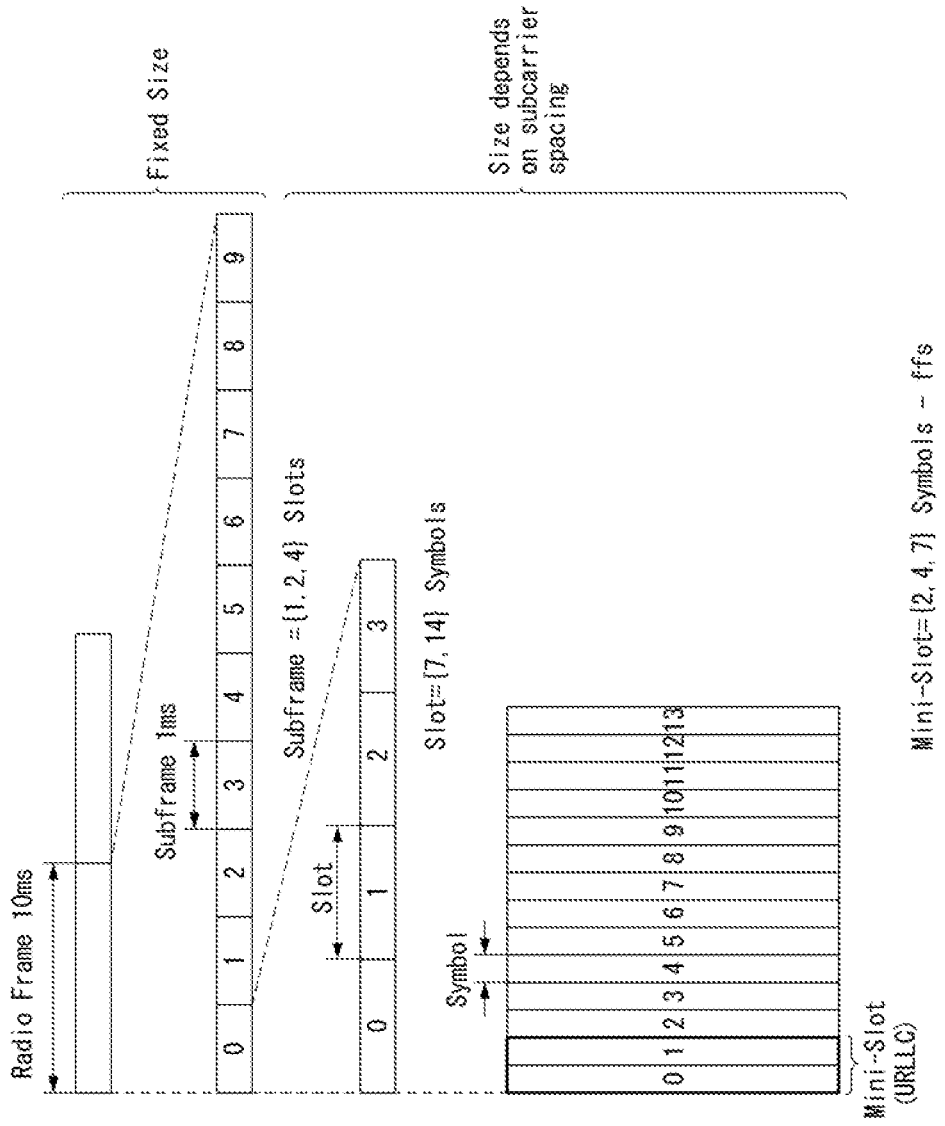
[FIG. 3]

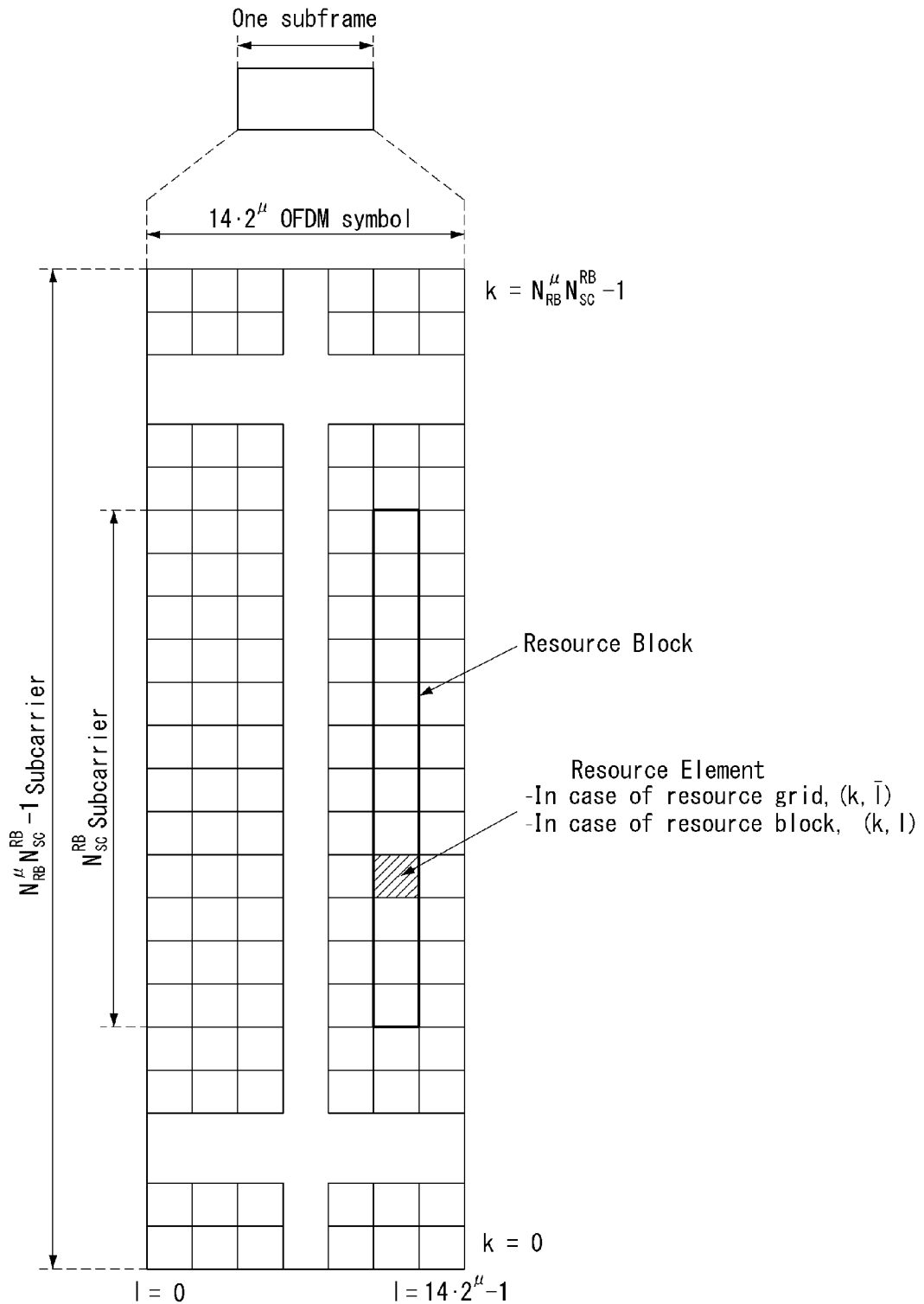
[FIG. 4]

[FIG. 5]
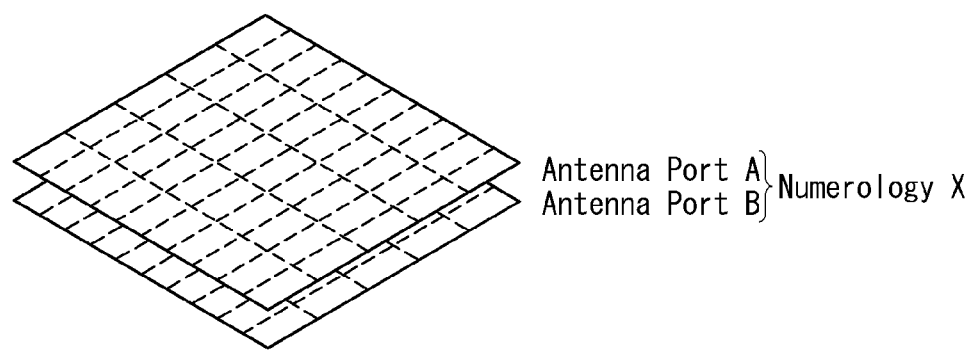
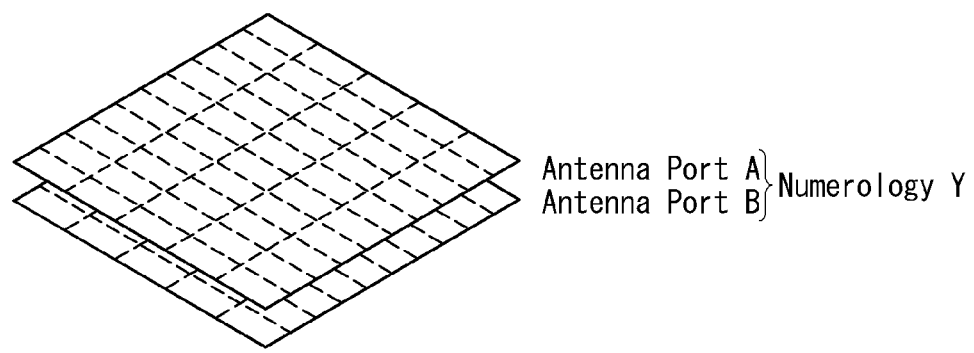

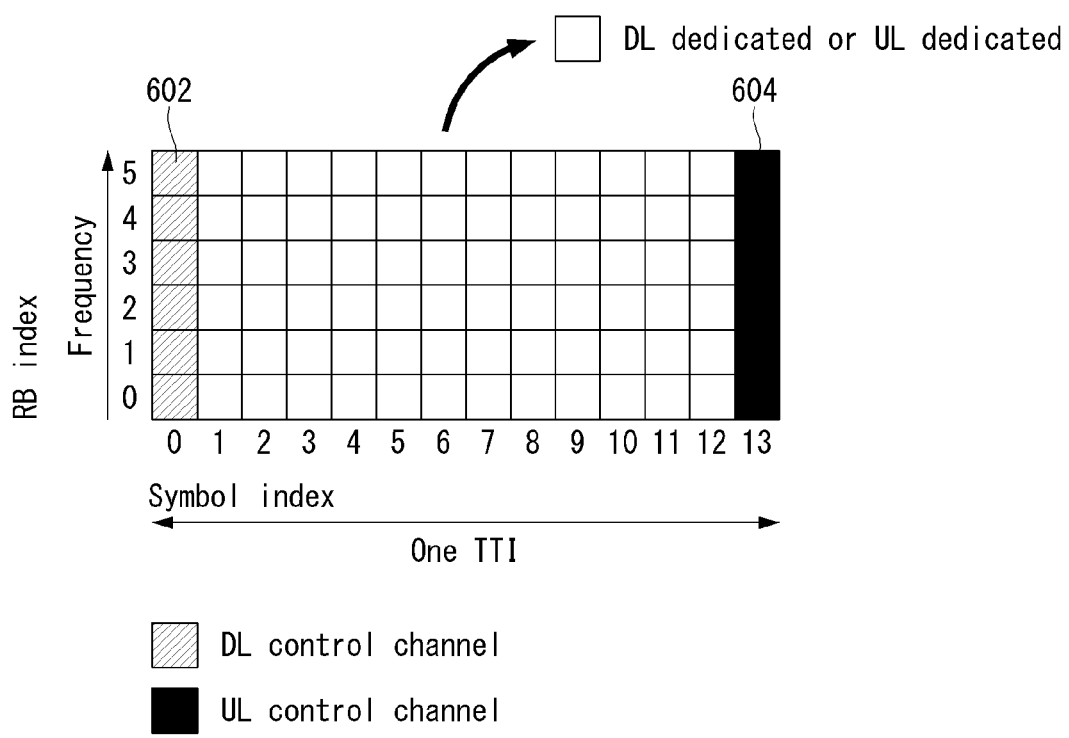
[FIG. 6]

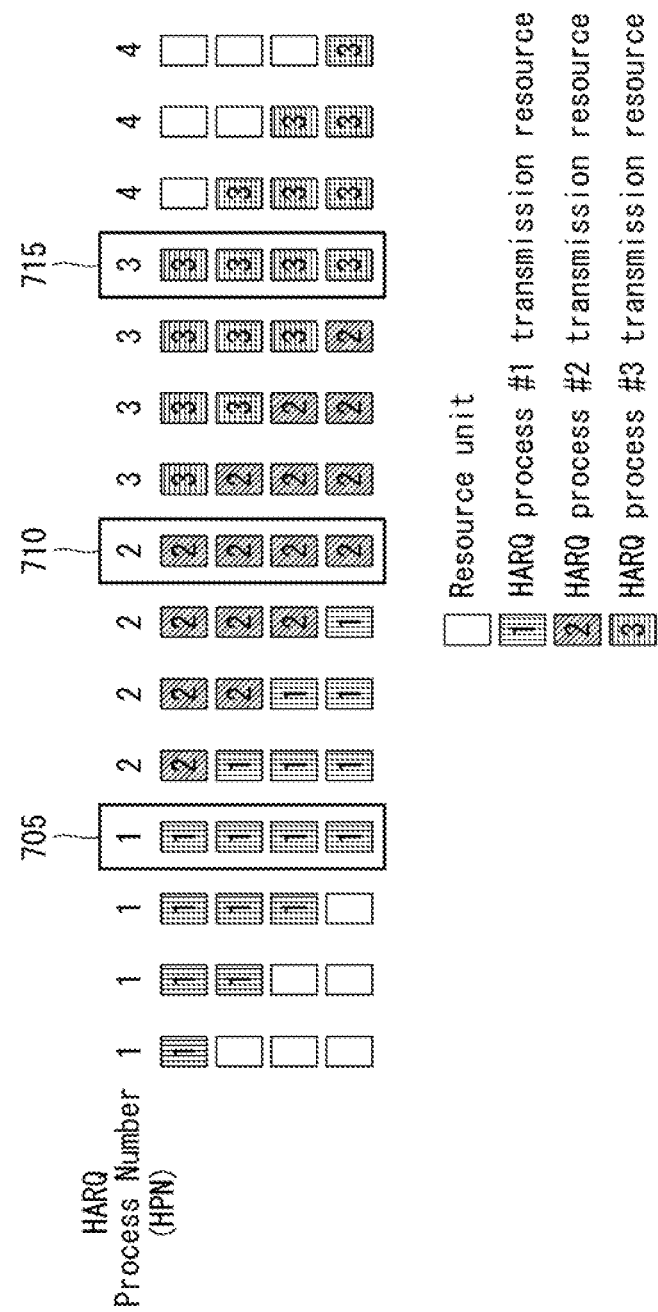
[FIG. 7]

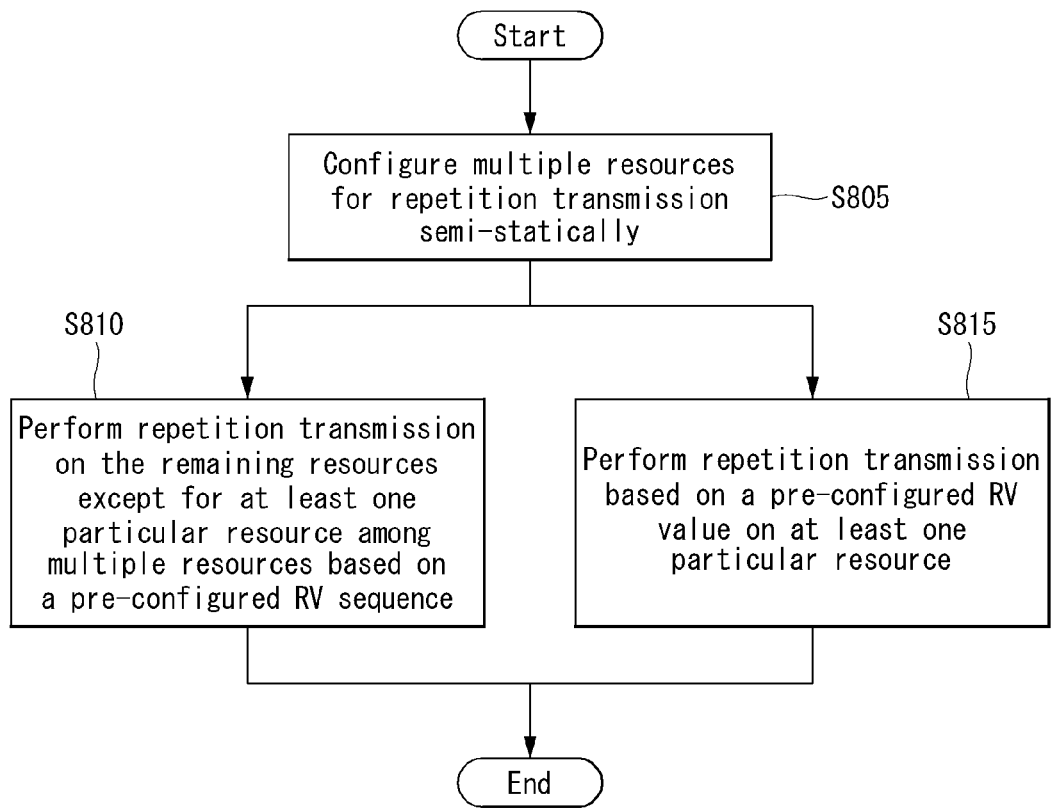
[FIG. 8]

[FIG. 9]
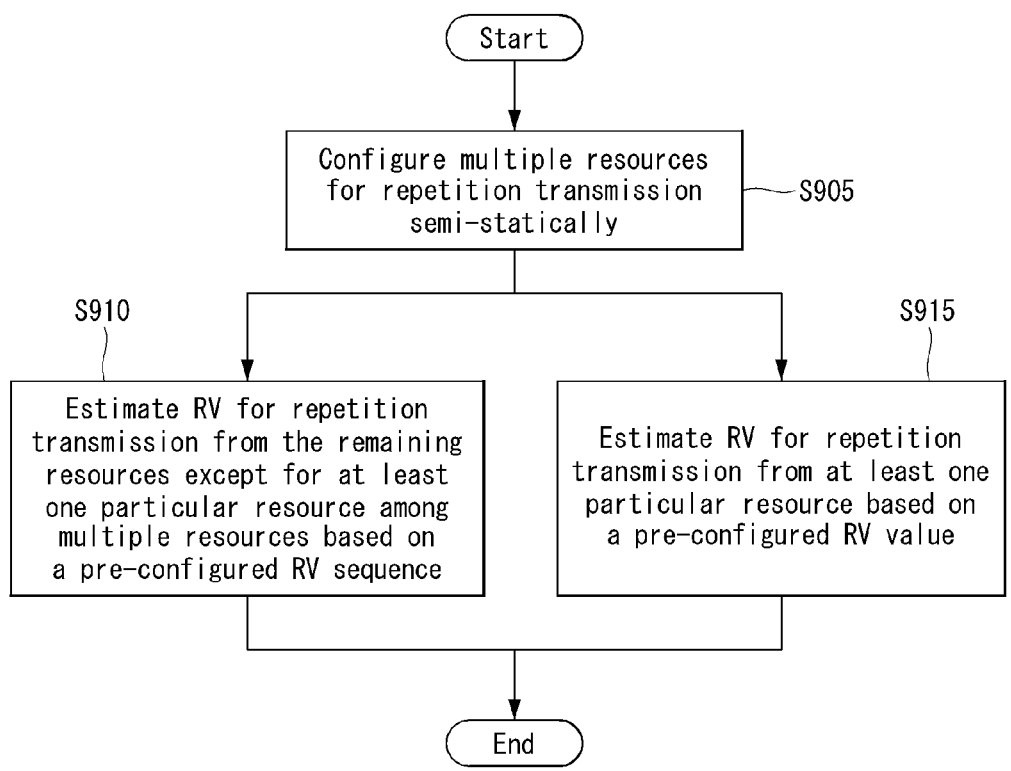

[FIG. 10]
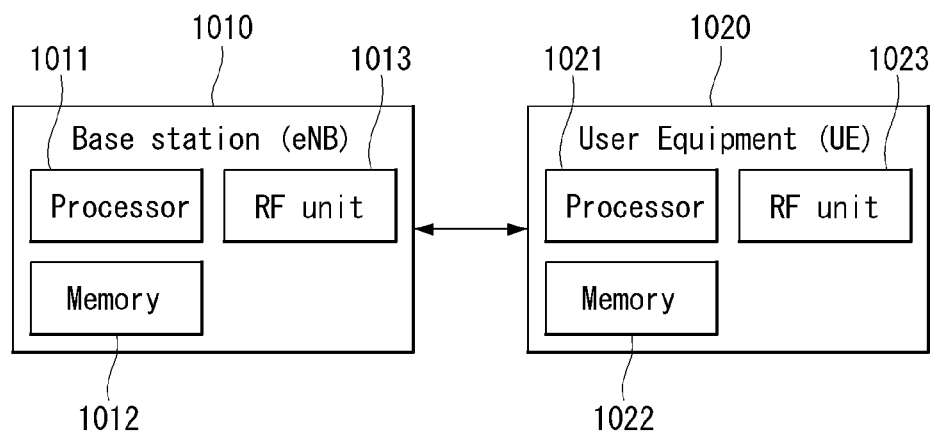

[FIG. 11]
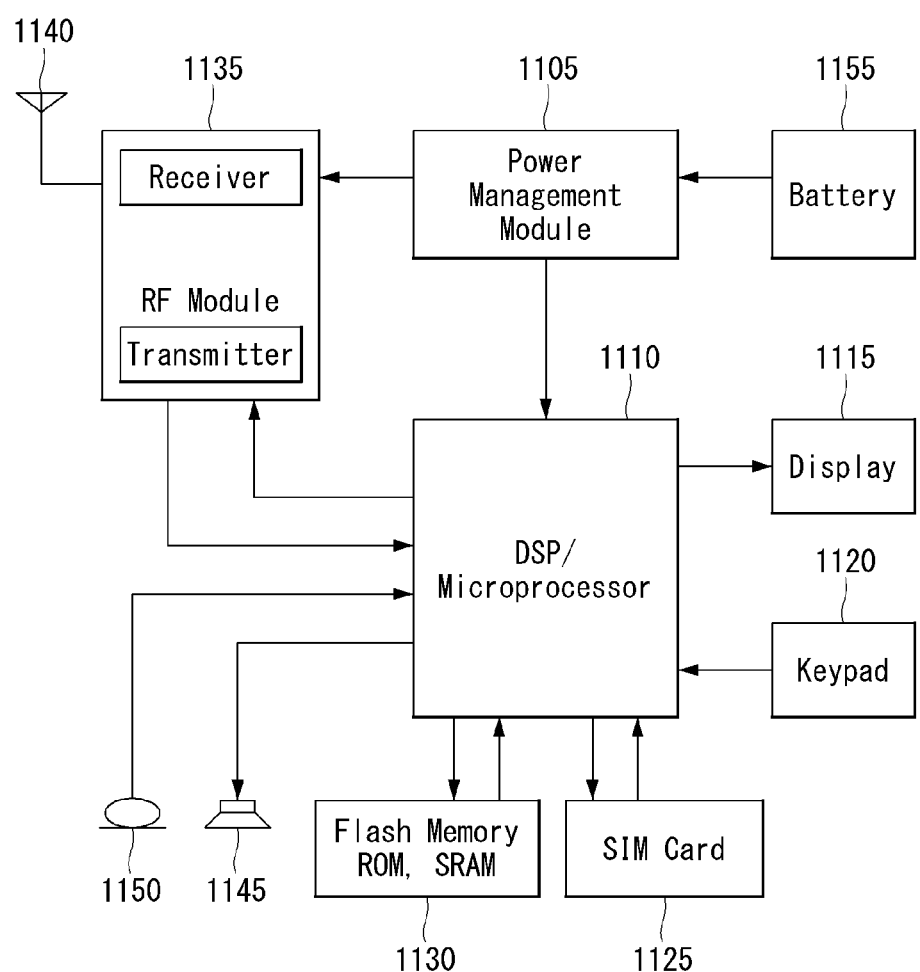

METHOD FOR TRANSMITTING OR RECEIVING WIRELESS SIGNAL IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2018/013707, filed on Nov. 12, 2018, which claims the benefit of U.S. Provisional Application No. 62/584,115, filed on Nov. 10, 2017, the contents of which are all hereby incorporated by reference herein in their entirety.

TECHNICAL FIELD

The present disclosure relates to a wireless communication system and, more particularly, to a method for transmitting and receiving a wireless signal and an apparatus supporting the method.

BACKGROUND ART

Mobile communication systems have been initially designed to provide voice services while guaranteeing mobility of users. However, the mobile communication system has evolved to provide data services as well as the voice services. Recently, since a shortage of resources is caused and users demand higher speed services due to explosive increase of traffic, a more advanced mobile communication system is required.

Requirements of next-generation mobile communication systems are largely to accommodate explosive data traffic, and per-user transmission mobile communication systems have been developed to provide voice services while ensuring user activity. However, the mobile communication system has expanded not only to voice but also to data services, and now, due to the explosive increase in traffic, a shortage of resources is caused and users demand higher speed services, so a more advanced mobile communication system is required.

Requirements of the next-generation mobile communication system include accommodation of explosive data traffic, support of tremendous increase of a transfer rate per user, accommodation of a significantly increased number of connected devices, support of ultra-low end-to-end latency, and support of high energy efficiency. To meet the requirements, various technologies are being studied, including dual connectivity, massive Multiple Input Multiple Output (MIMO), in-band full duplex, Non-Orthogonal Multiple Access (NOMA), super wideband, and device networking.

DISCLOSURE

Technical Problem

The present disclosure proposes a method for determining and/or estimating a redundancy version (RV) for transmitting and receiving a wireless signal.

More specifically, the present disclosure proposes a method for configuring or determining an RV sequence with respect to repetition transmission of a wireless signal and a method for using and estimating a pre-configured RV value from a particular resource.

Technical objects to be achieved in the present disclosure are not limited to the above-described technical objects, and other technical objects not described above may be evidently understood by a person having ordinary skill in the art to which the present disclosure pertains from the following description.

Technical Solution

In a method for performing repetition transmission of a wireless signal performed by a terminal in a wireless communication system according to an embodiment of the present disclosure, the method may comprise receiving a configuration of multiple resources for repetition transmission of the wireless signal semi-statically by a base station; wherein a redundancy version sequence for repetition transmission of the wireless signal is pre-configured, performing repetition transmission of the wireless signal based on the redundancy version sequence on the remaining resources except for at least one particular resource among the multiple resources; and performing repetition transmission of the wireless signal on the at least one particular resource based on a redundancy version value pre-configured for the at least one particular resource.

Also, in the method according to an embodiment of the present disclosure, the pre-configured redundancy version value may be derived by an index of the at least one particular resource.

Also, in the method according to an embodiment of the present disclosure, a Hybrid Automatic Repeat and reQuest (HARQ) process identifier may be mapped to each of the multiple resources based on an initial transmission position of repetition transmission of the wireless signal.

Also, in the method according to an embodiment of the present disclosure, the at least one particular resource may be a resource on which transmission based on the same HARQ process identifier is performed regardless of timing of the initial transmission.

Also, in the method according to an embodiment of the present disclosure, the at least one particular resource may be determined by repetition number of repetition transmission of the wireless signal and indices of the multiple resources.

Also, in the method according to an embodiment of the present disclosure, configuration information on the repetition number may be received through higher layer signaling from the base station.

Also, in the method according to an embodiment of the present disclosure, the pre-configured redundancy version value may be a first element of the redundancy version sequence. Or, the pre-configured redundancy version value may be redundancy version 0 (RV 0) or redundancy version 3 (RV 3).

In a method for a base station to estimate redundancy version of repetition transmission of a wireless signal performed by a terminal in a wireless communication system according to an embodiment of the present disclosure, the method may comprise configuring multiple resources of the terminal for repetition transmission of the wireless signal semi-statically; estimating, based on a redundancy version sequence, a redundancy version for repetition transmission of the wireless signal from the remaining resources except for at least one particular resource among the multiple resources, wherein the redundancy version sequence for repetition transmission of the wireless signal is configured in advance; and estimating a redundancy version for repetition transmission of the wireless signal from the at least one particular resource based on a redundancy version value pre-configured for the at least one particular resource.

Also, in the method according to an embodiment of the present disclosure, the pre-configured redundancy version value may be derived by an index of the at least one particular resource.

Also, in the method according to an embodiment of the present disclosure, a Hybrid Automatic Repeat and reQuest (HARQ) process identifier may be mapped to each of the multiple resources based on an initial transmission position of repetition transmission of the wireless signal.

Also, in the method according to an embodiment of the present disclosure, the at least one particular resource may be a resource on which transmission based on the same HARQ process identifier is performed regardless of timing of the initial transmission.

Also, in the method according to an embodiment of the present disclosure, the at least one particular resource may be determined by repetition number of repetition transmission of the wireless signal and indices of the multiple resources.

Also, in the method according to an embodiment of the present disclosure, configuration information on the repetition number may be received through higher layer signaling from the base station.

In a terminal performing repetition transmission of a wireless signal in a wireless communication system according to an embodiment of the present disclosure, the terminal may comprise a Radio Frequency (RF) unit for transmitting and receiving a wireless signal; and a processor connected functionally to the RF unit, wherein the processor is configured to receive a configuration of multiple resources for repetition transmission of the wireless signal semi-statically by a base station; wherein a redundancy version sequence for repetition transmission of the wireless signal is pre-configured, perform repetition transmission of the wireless signal based on the redundancy version sequence on the remaining resources except for at least one particular resource among the multiple resources, and perform repetition transmission of the wireless signal on the at least one particular resource based on a redundancy version value pre-configured for the at least one particular resource.

Advantageous Effects

According to an embodiment of the present disclosure, an effect may be obtained that when a reception apparatus (for example, a base station or a terminal) is unable to determine a transmission time point of a transmission apparatus (for example, a terminal or a base station), the reception apparatus may determine an RV value used for transmission without receiving additional signaling of the transmission apparatus.

Also, according to an embodiment of the present disclosure, an effect may be obtained that when a transmission apparatus uses repetition transmission, a reception apparatus may estimate part of RV values accurately from received transmissions even when the reception apparatus fails to receive part of repetition transmission (particularly, initial transmission) properly.

Also, according to an embodiment of the present disclosure, an effect may be obtained that when repetition number different from the length of a configured RV sequence is used, the corresponding RV sequence may be applied effectively.

Technical objects to be achieved in the present invention are not limited to the above-described technical objects, and other technical objects not described above may be evidently understood by a person having ordinary skill in the art to which the present invention pertains from the following description.

DESCRIPTION OF DRAWINGS

The accompanying drawings, which are included herein as a part of the description for help understanding the present invention, provide embodiments of the present invention, and describe the technical features of the present invention with the description below.

FIG. 1 is a diagram illustrating an example of an overall structure of a new radio (NR) system to which a method proposed by the present disclosure may be implemented.

FIG. 2 illustrates a relationship between a uplink (UL) frame and a downlink (DL) frame in a wireless communication system to which a method proposed by the present disclosure may be implemented.

FIG. 3 illustrates an example of a frame structure in the NR system. FIG. 3 is shown just for convenience of the description and does not limit the scope of the present disclosure.

FIG. 4 illustrates an example of a resource grid supported in a wireless communication system to which a method proposed by the present disclosure may be implemented.

FIG. 5 illustrates examples of resource grids for each antenna port and numerology to which a method proposed in this specification may be applied.

FIG. 6 illustrates one example of a self-contained structure to which the method proposed in this disclosure may be applied.

FIG. 7 illustrates one example of a method for determining a resource to which a particular RV value is to be applied according to the present disclosure.

FIG. 8 illustrates an operation flow diagram of a terminal performing repetition transmission of a wireless signal according to the present disclosure.

FIG. 9 illustrates an operation flow diagram of a base station estimating a redundancy version for repetition transmission of a wireless signal according to the present disclosure.

FIG. 10 illustrates a block diagram of a wireless communication apparatus to which methods according to the present disclosure may be applied.

FIG. 11 illustrates a block diagram of a communication apparatus according to one embodiment of the present disclosure.

MODE FOR INVENTION

Hereinafter, some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), an access point (AP), or generation NB (general NB, gNB). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical spirit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A/New RAT(NR) is chiefly described, but the technical characteristics of the present disclosure are not limited thereto.

As propagation of smart phones and Internet of things (IoT) terminals rapidly spreads, the amount of information which is transmitted and received through a communication network increase. Accordingly, in the next generation wireless access technology, an environment (e.g., enhanced mobile broadband communication) that provides a faster service to more users than existing communication systems (or existing radio access technology) needs to be considered.

To this end, a design of a communication system that considers machine type communication (MTC) providing a service by connecting multiple devices and objects is discussed. Further, a design of a communication system (e.g., Ultra-Reliable and Low Latency Communication (URLLC)) considering a service and/or a user equipment sensitive to reliability and/or latency of communication is also discussed.

Hereinafter, in this disclosure, for the convenience of description, the next-generation wireless access technology is referred to as a new radio access technology (New RAT; NR) and the wireless communication system to which the NR is applied is referred to as an NR system.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor fora control plane connection to an NGC.

User plane gateway: A terminal point of NG-U interface.

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or µ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$, DL and UL transmission is configured as a radio frame having a section of $T_f=(\Delta f_{max}N_f/100) \cdot T_s=10$ ms. The radio frame is composed of ten subframes each having a section of $T_{sf}=(\Delta f_{max}N_f/1000) \cdot T_s=1$ ms. In this case, there may be a set of UL frames and a set of DL frames.

FIG. 2 illustrates a relationship between a UL frame and a DL frame in a wireless communication system to which a method proposed by the present disclosure may be implemented.

As illustrated in FIG. 2, a UL frame number I from a user equipment (UE) needs to be transmitted $T_{TA}=N_{TA}T_s$ before the start of a corresponding DL frame in the UE.

Regarding the numerology $\mu$, slots are numbered in ascending order of $n_s^\mu \in \{0, \ldots, N_{subframe}^{slots, \mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 represents the number of OFDM symbols $N_{sym}^{slot}$ per slot in a normal CP, the number of slot $N_{slot}^{frame, \mu}$ per radio frame and the number of slot $N_{slot}^{subframe, \mu}$ per subframe, and Table 3 represents the number of OFDM symbols in an extended CP, the number of slot per radio frame and the number of slot per subframe.

TABLE 2

| $\mu$ | $N^{slot}_{symb}$ | $N^{frame, \mu}_{slot}$ | $N^{subframe, \mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| $\mu$ | $N^{slot}_{symb}$ | $N^{frame, \mu}_{slot}$ | $N^{subframe, \mu}_{slot}$ |
|---|---|---|---|
| 2 | 12 | 40 | 4 |

FIG. 3 illustrates an example of a frame structure in the NR system. FIG. 3 is shown just for the convenience of description but is not intended to limit the scope of the present invention.

Table 3 represents an example of $\mu=2$, that is, the case that subcarrier spacing is 60 kHz. Referring to Table 2, 1 subframe (or frame) may include 4 slots. 1 subframe={1,2, 4} slots shown in FIG. 3 are an example, and the number of slot(s) included in 1 subframe can be defined as represented in Table 2.

In addition, a mini-slot may include 2, 4 or 7 symbols, or include the more or the less symbols.

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

FIG. 4 illustrates an example of a resource grid supported in a wireless communication system to which a method proposed by the present disclosure may be implemented.

Referring to FIG. 4, a resource grid is composed of $N_{RB}^\mu N_{sc}^{RB}$ subcarriers in a frequency domain, each subframe composed of $14 \cdot 2^\mu$ OFDM symbols, but the present disclosure is not limited thereto.

In the NR system, a transmitted signal is described by one or more resource grids, composed of $N_{RB}^\mu N_{sc}^{RB}$ subcarriers, and $2^\mu N_{symb}^{(\mu)}$ OFDM symbols. Herein, $N_{RB}^\mu \leq N_{RB}^{max, \mu}$. The above $N_{RB}^{max, \mu}$ indicates the maximum transmission bandwidth, and it may change not just between numerologies, but between UL and DL.

In this case, as illustrated in FIG. 5, one resource grid may be configured for the numerology $\mu$ and an antenna port p.

FIG. 5 illustrates examples of resource grids for each antenna port and numerology to which a method proposed in this specification may be applied.

Each element of the resource grid for the numerology $\mu$ and the antenna port p is indicated as a resource element, and may be uniquely identified by an index pair (k, Ī). Herein, $k=0, \ldots, N_{RB}^\mu N_{sc}^{RB}-1$ is an index in the frequency domain, and $\bar{l}=0, \ldots, 2^\mu N_{symb}^{(\mu)}-1$ indicates a location of a symbol in a subframe. To indicate a resource element in a slot, the index pair (k, l) is used. Herein, $l=0, \ldots, N_{symb}^\mu-1$.

The resource element (k, Ī) for the numerology $\mu$ and the antenna port p corresponds to a complex value $a_{k,\bar{l}}^{(p, \mu)}$. When there is no risk of confusion or when a specific antenna port or numerology is specified, the indexes p and $\mu$ may be dropped and thereby the complex value may become $a_{k,\bar{l}}^{(p)}$ or $a_{k,\bar{l}}$.

In addition, a physical resource block is defined as $N_{sc}^{RB}=12$ consecutive subcarriers on a frequency domain.

Point A plays the role of a common reference point of the resource block grid and may be obtained as follows.

offsetToPointA with respect to Pcell downlink represents a frequency offset between the lowest subcarrier of the lowest resource block overlapped with SS/PBCH block used by a UE for an initial cell selection with point A, and represents by resource block units assuming 15 kHz subcarrier spacing for FR1 and 60 kHz subcarrier spacing for FR2;

absoluteFrequencyPointA represents frequency-position of point A represented as in absolute radio-frequency channel number (ARFCN).

Common resource blocks are numbered from 0 to upper sides in a frequency domain for subcarrier spacing configuration μ.

The center of subcarrier 0 of common resource block 0 for the subcarrier spacing configuration μ coincides with 'point A'. Resource element (k, l) for the common resource block number and the subcarrier spacing configuration μ in a frequency domain may be given as represented in Equation 1 below.

$$n_{CRB}^{\mu} = \left\lfloor \frac{k}{N_{sc}^{RB}} \right\rfloor \quad \text{[Equation 1]}$$

Herein, k may be defined relatively to point A such that k=0 corresponds to the subcarrier with point A in the center. The number from 0 to $N_{BWP,i}^{size}-1$ are numbered to the physical resource blocks in a bandwidth part (BWP) and i is the number of the BWP. In BWP i, the relation between the physical resource block $n_{PRB}$ and the common resource block $n_{CRB}$ may be given as represented in Equation 2 below.

$$n_{CRB} = n_{PRB} + N_{BWP,i}^{start} \quad \text{[Equation 2]}$$

Herein, $N_{BWP,i}^{start}$ may be the common resource block in which the BWP starts relatively to common resource block 0.

Self-Contained Structure

A time division duplexing (TDD) structure considered in the NR system is a structure in which both uplink (UL) and downlink (DL) are processed in one slot (or subframe). This is to minimize the latency of data transmission in the TDD system and the structure may be referred to as a self-contained structure or a self-contained slot.

FIG. 6 illustrates one example of a self-contained structure to which the method proposed in this disclosure may be applied. FIG. 6 is shown just for convenience of the description and does not limit the scope of the present disclosure.

Referring to FIG. 6, it is assumed that one transmission unit (e.g., slot or subframe) is constituted by 14 orthogonal frequency division multiplexing (OFDM) symbols as in legacy LTE.

In FIG. 6, a region 602 refers to a downlink control region and a region 604 refers to an uplink control region. Further, a region (that is, a region without a separate indication) other than the regions 602 and 604 may be used for transmitting downlink data or uplink data.

That is, uplink control information and downlink control information may be transmitted in one self-contained slot. On the contrary, in the case of data, the uplink data or downlink data may be transmitted in one self-contained slot.

When the structure illustrated in FIG. 6 is used, in one self-contained slot, downlink transmission and uplink transmission may sequentially proceed, and transmission of the downlink data and reception of uplink ACK/NACK may be performed.

Consequently, when an error of data transmission occurs, a time required for retransmitting data may be reduced. Therefore, latency associated with data delivery may be minimized.

In the self-contained slot structure illustrated in FIG. 6, a time gap for a process of switching from a transmission mode to a reception mode in a base station (eNodeB, eNB, or gNB) and/or a terminal (user equipment (UE)) or a process of switching from the reception mode to the transmission mode is required. In association with the time gap, when the uplink transmission is performed after the downlink transmission in the self-contained slot, some OFDM symbol(s) may be configured as a guard period (GP).

Analog Beamforming

Since a signal in the millimeter wave (mmW) band has short wavelength, it is possible to install multiple antennas on the same area. In other words, in the 30 GHz band, the corresponding wavelength is about 1 cm, and a total of 100 antenna elements may be installed in a two dimensional array form on a panel of 5 cm×5 cm size with spacing of 0.5 lambda.

Therefore, in the mmW band, multiple antenna elements may be used to improve the beamforming (BF) gain, thereby extending coverage or increasing throughput.

In this case, if a transceiver unit (TXRU) is used to allow adjustment of transmission power and phase for each antenna element, independent beamforming may be realized for each frequency resource.

However, installing TXRUs in all of the antenna elements (for example, one hundred antenna elements) raises an effectiveness issue in terms of cost. Therefore, a method for mapping multiple antenna elements to one TXRU and adjusting a beam direction by using an analog phase shifter is being considered.

However, this kind of analog beamforming (BF) method has a disadvantage that frequency selective BF is not possible because only one beam direction may be implemented over the whole band.

As an intermediate solution between digital BF and analog BF, hybrid BF employing B TXRUs, the number of which is smaller than the number of antenna elements, Q, may be taken into consideration. In this case, in spite of variations due to how B TXRUs are connected to Q antenna elements, the number of beam directions for simultaneous transmission may be limited below B.

Method for Configuring Redundancy Version (RV) in NR System

In NR system, depending on the service area (namely, application area) or traffic type, a UE may perform uplink transmission without receiving a grant (for example, an uplink (UL) grant) when the UE performs uplink transmission. In this case, the UE may perform uplink transmission through a resource configured semi-persistently.

The transmission scheme above may be referred to as a grant-free transmission scheme. At this time, the grant-free transmission scheme may also be referred to as a configured-grant transmission scheme in that configuration information such as resource allocation is transmitted through higher layer signaling.

In other words, the grant-free transmission scheme according to the present disclosure may mean a scheme in which a UE performs uplink transmission without receiving a grant (for example, an UL grant) from a base station (namely, without a grant). That is, the grant-free transmission scheme may mean a scheme in which a UE performs uplink transmission based on semi-static scheduling rather than dynamic scheduling by a base station. In this case, the UE may receive a configuration of resources for uplink transmission in advance, and the corresponding UE may perform uplink transmission on a configured resource by assuming that a grant has been given to the configured resource.

Differently from the above, a scheme in which a UE performs uplink transmission based on a grant received from a base station may be referred to as a grant-based transmission scheme. Also, the grant-based transmission scheme may be referred to as uplink transmission scheduled by DCI (for example, PUSCH transmission) in that the grant-based transmission is uplink transmission by dynamic scheduling.

In the case of the grant-free transmission scheme, radio resources shared among different UEs in a contention-based manner or radio resources allocated to UEs in a dedicated manner may be used.

In NR system, a method for applying different modulation and/or coding schemes to radio resources used in the grant-free transmission scheme and radio resources allocated through an uplink grant (namely, the grant-based transmission scheme) may be considered. Also, a method for applying different Transport Block Sizes (TBSs) and/or different Transmission Time Intervals (TTIs) to the grant-free transmission scheme and the grant-based transmission scheme may be considered.

Also, the UE may be allocated one or more radio resources in the grant-free transmission scheme, and multiple resources used in the grant-free transmission scheme may be so configured to have the same or different (or overlapping) sizes, modulation and coding schemes, and time/frequency scheduling units. Also, to improve the success rate of the grant-free transmission scheme, a method for configuring a UE to attempt transmission of the same data (or traffic) repeatedly may be considered.

The repetition transmission may be used not only for uplink transmission but also for downlink transmission to ensure reliability of transmission.

In this regard, the present disclosure proposes a method for configuring, determining and/or selecting a redundancy version (RV) to be used when a UE performs uplink transmission and/or downlink reception by using resources allocated by a base station (in particular, semi-static resources).

Specifically, in what follows, described will be a method for making the gain of an RV sequence as efficient as possible while a UE and/or a base station estimates the RV for transmission and reception without additional signaling when the corresponding transmission and reception is configured without separate signaling such as an uplink (UL) grant and/or a downlink (DL) grant (or downlink assignment).

In what follows, methods and/or embodiments according to the present disclosure are distinguished from each other only for the convenience of descriptions, and it should be understood that structures of the methods and/or embodiments may be substituted by each other or may be used after being combined with each other.

First, with respect to the repetition transmission and reception of a base station and/or a UE, a method for determining a redundancy version (RV) will be described.

To combine transmissions received by a base station and/or a UE (for example, to perform soft combining), it is necessary to estimate the RV of each transmission. At this time, since a wrongly estimated RV may degrade decoding performance, it is necessary that the RV for each transmission is estimated accurately to improve performance of combining. In particular, in the case of a UE, differently from the base station, since it may be difficult to attempt blind decoding for some cases (for example, due to a limit of hardware capacity), there exists a large possibility that the UE fails transmission and reception when the RV is not estimated accurately.

In the case of typical transmission, the RV value for transmission may be determined or configured by signaling of a base station, an uplink grant and/or a downlink grant (or downlink assignment). On the other hand, if transmission based on a resource configured semi-statically (for example, a resource configured through higher layer signaling) is performed without separate signaling, a rule for determining (or configuring or selecting) an RV to be applied to the corresponding transmission may be required.

In particular, if repetition transmission utilizing additional resources available is used together with RV cycling, a method for determining an RV to be applied for repetition transmission may also need to be considered. Here, an RV cycling scheme may mean a scheme in which predetermined RV values are applied in a cyclic manner for repetition transmission.

Also, an RV mapping scheme where resources on which repetition transmission is performed are changed by a dynamic or static rate matching resource may also need to be considered.

At this time, related to the descriptions above, the following methods 1-1 to 1-3 may be considered. The methods described below may be performed independently or may be performed by being substituted by another component for part of their structure or by being combined with each other.

(Method 1-1)

First, a method for using an RV sequence sequentially from initial transmission may be considered when the RV sequence to be used for repetition transmission exists. The method assumes that an RV sequence is repeated for the initial transmission and for repetition transmission subsequent to the initial transmission. In other words, an RV sequence may be mapped in terms of actual transmission. Here, the RV sequence may mean a sequence composed of RV values to be applied to each transmission as described above.

In this case, if repetition transmission is skipped as part of the resources is not available for the repetition transmission (for example, a resource for which rate matching has been applied, a reserved resource, or an unknown resource), the corresponding RV sequence may also be deployed or allocated in such a way that the corresponding resource is skipped.

If the corresponding method is applied, a count of repetition transmission mapped to resources left unused may be increased. In other words, the maximum amount of resources that may be used by a UE and/or a base station is already determined, and repetition transmission actually performed may differ depending on resources. Or, repetition transmission may be postponed in consideration of a particular resource.

Similarly, when an RV sequence to be used for repetition transmission exists as described above, a method for mapping the RV sequence sequentially to resources from a resource of initial transmission may be considered. That is, regardless of actual transmission, an RV sequence may be mapped sequentially to resources from a resource used for initial transmission. In other words, separately from the transmission actually performed, the RV sequence may be mapped in terms of resources configured for the initial transmission and repetition transmission.

In this case, as described above, an RV sequence may be increased to be mapped even when repetition transmission is skipped as part of the resources is unavailable for the repetition transmission. This operation may be intended to ensure that the RV value does not change even when a UE and/or a base station encounters an ambiguity for a resource.

Related to the descriptions above, when counting of initial transmission and/or repetition transmission is applied while a count of the initial transmission and/or repetition transmission is adopted, an unavailable resource may be determined by the following examples. Although the following methods are described based on repetition transmission of a UE, the methods may also be applied similarly to the repetition transmission of a base station.

For example, a rate matching resource configured semi-statically in a cell-specific and in a UE-specific manner and/or a flexible resource, a downlink resource, or a rate matching resource according to a DL/UL configuration may be considered to be an unavailable resource. In this case, if a resource is partially overlapped at the time of counting, the UE may be configured to skip (or drop) initial transmission and/or repetition transmission. Or, the UE may be configured to skip the initial transmission and/or the repetition transmission only when a resource is fully overlapped. Or, the UE may be configured to skip the initial transmission and/or the repetition transmission only when the corresponding resource is overlapped with the resource (or position) of a Demodulation Reference Signal (DMRS).

In another example, a rate matching resource configured in a cell-specific manner and/or a flexible resource, a downlink resource, or a rate matching resource according to a DL/UL configuration may be considered to be an unavailable resource. In this case, when a resource is partially overlapped at the time of counting, the UE may be configured to skip (or drop) initial transmission and/or repetition transmission. Or, the UE may be configured to skip the initial transmission and/or the repetition transmission only when the corresponding resource is overlapped with the resource (or position) of a Demodulation Reference Signal (DMRS).

Also, for the examples above, skipping (or dropping) initial transmission and/or repetition transmission may be additionally considered for a resource determined by a particular identifier (for example, a Slot Format Indicator (SFI)) as unavailable. Also, a UE may receive, from a base station, information on a resource for which initial transmission and/or repetition transmission is to be skipped (or dropped) through higher layer signaling. Also, the RV sequence in the methods described above may be used in such a way that if a count of transmission is increased, the next RV value is applied.

(Method 1-2)

Or, a method for deriving an RV value to be used for repetition transmission from a particular index shared between a UE and a base station may be considered.

For example, an RV value may be derived from a resource index on the absolute (for example, physical) or logical time domain/frequency domain/code domain. In other words, after determining (or selecting) an RV value based on an index of a resource configured by the base station, the UE may perform transmission on the corresponding resource by applying the corresponding RV value.

In another example, when an HARQ identifier (ID) (namely, an HARQ process ID) is mapped consecutively to the resources on the time domain/frequency domain/code domain, a method for mapping an RV sequence to contiguous resources configured with the same HARQ ID may also be considered.

(Method 1-3)

Or, a method for a base station to explicitly indicate an RV value to be used for repetition transmission may be considered. In other words, an RV value to be used for repetition transmission may be explicitly indicated for a UE by the base station, and the UE may accordingly be configured to apply the RV value. For example, the base station may configure (or indicate) the UE to change an RV value to be used for transmission through higher layer signaling and/or by using an RV field of a re-transmission grant. At this time, if the UE fails to receive the separate indication, the corresponding UE may be configured to use the same RV value as used before repetition transmission.

In the case of the method 1-1, an advantage is obtained that since an RV sequence pre-configured effectively is used, a gain from using different RVs may be achieved more quickly. However, since the corresponding method uses initial transmission as an anchor of the RV sequence (namely, as a reference), if the initial transmission is not performed properly, the effect of repetition transmission subsequent to the initial transmission may be reduced.

Also, in the case of the method 1-2, an advantage is obtained that since an RV is mapped to a resource index, the RV of the corresponding transmission may be estimated without relying on the relationship with another transmission. In other words, in the case of the corresponding method, even if only one transmission rather than the initial transmission is received properly, a receiver may estimate the RV of the corresponding transmission. However, since the RV used at the start of transmission is not selected by a main operator of transmission (namely, the transmission apparatus) but determined by an index of the used resource, it may be difficult for the receiver to predict which RV sequence will be used for repetition transmission. In other words, a gain from using different RVs may be achieved later than expected.

For example, if an RV sequence of [0 2 3 1] is used, while the method 1-1 always guarantees the use of a preconfigured RV sequence according to the order of transmission, transmission may be started in the order of 'RV 2-RV 3' or 'RV 1-RV 0' in the method 1-2. Here, 'RV n' may mean the RV value corresponding to n. If the order of the preconfigured RV sequence is not maintained, a coding gain may be reduced when initial two transmissions are received, which may indicate that the number of transmissions required for the success of transmission is larger in the case of the method 1-2 than in the case of the method 1-1.

To reduce disadvantages inherent in the respective methods above, a method for fixing the position of initial transmission may be considered, which may not be efficient in terms of latency in that a resource configured semi-statically is typically used for latency-sensitive traffic.

Therefore, considering the descriptions above, the present disclosure proposes a method for determining an RV sequence and/or a RV value to be used for transmission by combining the methods 1-1 and 1-2.

Specifically, in what follows, the present disclosure proposes a method for using a pre-configured (or pre-defined) RV sequence for default transmission (namely, initial transmission and repetition transmission) when a transmission apparatus (for example, a UE or a base station) uses a resource configured semi-statically and for using a pre-configured (or pre-defined) RV value instead of the RV sequence for a resource at a particular position.

Through the method above, although the transmission apparatus performs repetition transmission since the initial transmission while maintaining the order of the RV sequence, even if the initial transmission fails, a main operator of reception (namely, a reception apparatus) (for example, a base station or a UE) may estimate the RV accurately for a resource at a particular position among the resources. Therefore, an effect is obtained that a risk caused when the initial transmission fails is minimized while a gain from using an RV sequence is maintained. Also, another effect is obtained that advantages and disadvantages of the methods described above may be balanced according to a method for determining the particular position (namely, a resource at the particular position to which a preconfigured RV value is applied).

At this time, when a pre-configured (namely, specified) RV value is used instead of a pre-configured RV sequence (namely, by ignoring a pre-configured RV sequence), the following methods 2-1 and 2-2 may be considered to determine the corresponding RV value. In what follows, the methods described below may be performed independently or may be performed by being substituted by another component for part of their structure or by being combined with each other.

(Method 2-1)

First, an RV value to be applied to a resource at the particular position may be determined by considering self-decodability of the RV. Since a scheme that uses a pre-configured RV value may be useful for a case where other transmission such as initial transmission is not performed properly, it may be necessary to consider a case where a reception apparatus receives only the transmission corresponding to a resource at a particular position (namely, a resource to which a pre-configured RV value is applied).

Considering the description above, it may be efficient to use an RV value having excellent self-decodability and containing a systematic bit among RV values so that even if a reception apparatus (for example, a base station or a UE) receives only one transmission, decoding of the corresponding transmission may be performed. As one example, the transmission apparatus may be configured to perform transmission on the resource at the particular position by applying the value of 'RV 0' (for example, an RV corresponding to 0 among '0, 1, 2, 3') or to perform transmission by applying a value of 'RV 0' or 'RV 3' according to the coding rate.

(Method 2-2)

Alternatively, an RV value to be applied to the resource at the particular position may be configured as a first value of the RV sequence to be used by a transmission apparatus (namely, the RV sequence configured for the transmission apparatus). This is so since the first value of an RV sequence is configured by reflecting an element such as self-decodability of the RV, using the first value of the RV sequence may be efficient.

Through the methods above, a particular RV value to be applied to a resource at a particular position according to the present disclosure may be determined.

Also, when a pre-configured (namely, specified) RV value is used instead of a pre-configured RV sequence (namely, by ignoring a pre-configured RV sequence), the following methods 3-1 and 3-2 may be considered to determine a resource to which the corresponding RV value is to be applied. In what follows, the methods described below may be performed independently or may be performed by being substituted by another component for part of their structure or by being combined with each other.

(Method 3-1)

First, resources at particular positions to which the RV values are to be applied may be configured to be repeated with a predetermined period. As one example, when the period is configured to be 4, a UE may be configured to perform transmission by applying an RV value specified every four transmission units. In this case, the start point of the period (namely, a reference point for application of the period) may be configured to be a resource allocated at initial transmission or indicated separately by a base station.

The configuration information on the period may be defined over the system, or the corresponding configuration information may be transmitted to a UE by the base station. As one example, the base station may transmit (or allocate), to a UE, information on the period of a resource to which a pre-configured RV value is to be applied through higher layer signaling (for example, RRC signaling or MAC-CE) and/or physical layer signaling (for example, Layer-1 (L1) signaling or DCI).

Since the corresponding method performs transmission by applying a particular RV value according to a configured period and performs reception by predicting that a particular RV value will be applied, an advantage is obtained that operational complexity of a transmission apparatus and/or a reception apparatus is reduced.

(Method 3-2)

Alternatively, a resource to which the RV value is to be applied may be determined by considering an HARQ process ID configured for each resource (and/or each transmission).

Specifically, when initial transmission determines not only the RV value but also the HARQ process ID of transmitted data, a resource having (always) the same HARQ process ID regardless of the resource used for the initial transmission may be configured as a resource to which the RV value is to be applied. As one example, considering repetition transmission according to the position of initial transmission, a UE may perform transmission, differently from how transmission is performed on other resources, by applying the RV value to the resource (for example, the last resource having the same HARQ process ID) on which transmission corresponding always to the same HARQ process ID is performed. In this case, the base station may perform estimation and reception by predicting that the corresponding RV value will be applied to the corresponding resource.

FIG. 7 illustrates one example of a method for determining a resource to which a particular RV value is to be applied according to the present disclosure. FIG. 7 is intended only for the convenience of descriptions and is not intended to limit the technical scope of the present disclosure.

Referring to FIG. 7, it is assumed that an HARQ process ID is configured for initial transmission and/or repetition transmission (or a resource on which each transmission is performed) between a transmission apparatus (for example, a UE or a base station) and a reception apparatus (for example, a base station or a UE).

As one example, HARQ process IDs of initial transmission and repetition transmission are determined according to the position of the initial transmission, and when the initial transmission may begin at any position within the corresponding area, the last resource among resources allocated to the same HARQ process may always be used for transmission with respect to the corresponding HARQ process ID.

In other words, as shown in FIG. 7, suppose an HARQ process number (HPN) (namely, an HARQ process ID) is allocated to each of the resources configured (or allocated) for transmission by the transmission apparatus. At this time, depending on the position of initial transmission, positions of HARQ process #1 resource, HARQ process #2 resource, and HARQ process #3 resource may be configured differently from each other. However, regardless of the position of the initial transmission, the transmission apparatus may always perform transmission corresponding to the HARQ process #1 on resource 705, always perform transmission corresponding to the HARQ process #2 on resource 710, and always perform transmission corresponding to the HARQ process #3 on resource 715. In other words, transmission for the corresponding HARQ process number may always be performed on the last resource among resources to which the respective HARQ process numbers are allocated.

In FIG. 7, it is assumed that the repetition number is 4, and a resource to which the RV value is to be applied is determined every four resource units. However, it should be noted that the aforementioned scheme may be extended to be applied to various repetition numbers. As one example, when the repetition number is configured to be 2 for a UE and/or a base station, a resource to which the RV value is to be applied may be determined every two resource units. In other words, a resource at a particular position to which the RV value is to be applied may be determined according to indices (or number of resources) and repetition number of resources (semi-statically) configured for the UE and/or the base station.

As described above, when a transmission apparatus always performs transmission on a resource at a particular position by applying a pre-configured (namely, specified) RV value, an advantage is obtained that a reception apparatus may accurately estimate both the HARQ process ID and the RV value for the corresponding transmission.

Also, related to repetition transmission in the next-generation communication system (for example, NR system), a method for configuring the maximum repetition number differently for each UE may be considered. However, it may be inefficient to configure all possible combinations of RV sequences for all possible repetition transmission numbers.

Accordingly, the present disclosure proposes methods 4-1 to 4-3 for applying an RV sequence having a length configured to be suitable for a particular repetition transmission number to different repetition transmission numbers. In what follows, for the convenience of descriptions, the particular repetition transmission number is denoted by 'K', and it is assumed that an RV sequence having a length of K is applied to different repetition transmission numbers (for example, K1 and K2). Also, K' denotes a value configured separately from length K, K1, and K2 of the RV sequence or a predefined value, which may be a value for implicitly configuring an RV sequence to be used for transmission by a transmission apparatus.

(Method 4-1)

First, described will be a method for using an RV sequence when the length of the RV sequence is K and repetition number K1 is smaller than K1' (namely, K1K). Here, K' is smaller than or equal to K (namely, K'K).

In this case, a transmission apparatus (for example, a UE or a base station) may be configured to use only the first value of the corresponding RV sequence or to perform transmission by using only an RV value with high self-decodability (for example, RV 0 or RV 3) from the RV sequence.

When the number of repetition transmissions is small, a failure of RV transmission including a systematic bit may become more critical. Therefore, when the number of repetitions is small, it may be efficient to use only such an RV value exhibiting high self-decodability not only to achieve coding gain but also to prepare for transmission failure.

(Method 4-2)

Next, described will be a method for using an RV sequence when the length of the RV sequence is K and repetition number K1 is larger than K1 and smaller than K (namely, K'≤K1≤K).

In this case, a transmission apparatus may be configured to perform transmission by using a configured RV sequence directly. As one example, when an RV sequence with a length of K is composed of [R_0, R_1, . . . , R_K', . . . , R_K-1, R_K], the RV sequence used for K1 repetition transmissions may be [R_0, R_1, . . . , R_K', R_K1-1, R_K1].

(Method 4-3)

Next, described will be a method for using an RV sequence when the length of the RV sequence is K and repetition number K1 is larger than K1' and smaller than K (namely, K≤K≤1).

In this case, a transmission apparatus may be configured to perform transmission by applying a configured RV sequence repeatedly. As one example, when an RV sequence with a length of 4, [A B C D], is applied to 10 repetition transmissions, the RV sequence applied for the 10 repetition transmissions may be [ABCDABCDAB].

Alternatively, the transmission apparatus may be configured to perform transmission by applying an RV sequence that repeats each element of a configured RV sequence [K1/K] times. As one example, when an RV sequence with a length of 4, [A B C D], is applied to 8 repetition transmissions, the RV sequence applied for the 8 repetition transmissions may be [A A B B C C D D]. At this time, if K1 is not divided evenly by K, the transmission apparatus may perform repetition transmission additionally in the order of decreasing self-decodability of RV values or perform transmission by using an RV sequence determined by additionally repeating a preceding element. As one example, suppose self-decodability is in the order of A, B, C, and D, and an RV sequence with a length of 4, [A B C D] is applied to 10 repetition transmissions. In this case, the RV sequence applied to 10 repetition transmissions may be [A A B B C C D D A A] or [A A A B B B C C C D D].

Also, in a more general case, when an RV sequence is given by {RV 1, RV 2, RV 3, RV 4}, the RV sequence may be applied as follows.

A method may be considered, where, first, 'RV i' (namely, the i-th RV value) is applied for each transmission and/or resource, and then 'RV i+1' is applied to the next transmission and/or resource. In other words, an RV value belonging to an RV sequence may be applied one after another to each transmission and/or resource.

Alternatively, a method may be considered, which applies one RV value repeatedly N times and then moves to the next RV value.

At this time, the N value may be configured through higher layer signaling between a base station and a UE.

Or, the N value may be defined by the ceil function (repetition number/the number of RV elements belonging to a selected RV sequence). ceil(x) may mean a function that rounds figures of x after the decimal point toward positive infinity to return an integer. In this case, whether to apply repetition for each RV value or to apply repetition as a bundle over the whole RV sequence may be configured additionally. Also, the N value may be configured differently for each semi-statically configured resource or resource configuration.

Or, the N value may be configured to be a fixed value on the system. In other words, the N value may be indicated on the specifications according to a range of repetition number. As one example, if the repetition number ranges from 4 to 8, N may be configured to be 2 while, if the repetition number is larger than 8, N may be configured to be 4.

FIG. 8 illustrates an operation flow diagram of a UE performing repetition transmission of a wireless signal according to the present disclosure. FIG. 8 is intended only for the convenience of descriptions and is not intended to limit the technical scope of the present disclosure.

Referring to FIG. 8, it is assumed that a UE and a base station select an RV value to be applied for transmission and estimate an RV value applied to the corresponding transmission based on the methods described above. Also, in the case of FIG. 8, it is assumed that the UE performs repetition transmission, and the base station receives the repetition transmission; however, the assumption is only an example, and the corresponding scheme may also be applied for the opposite case.

First, the UE may receive a configuration of multiple resources for repetition transmission of a wireless signal semi-statically by the base station S805. In other words, the UE may receive, from the base station, configuration information on multiple resources on which repetition transmission of a wireless signal is to be applied through a semi-static scheme (for example, higher layer signaling). In this case, a redundancy version (RV) sequence for repetition transmission of a wireless signal may be configured in advance.

Afterwards, the UE may perform repetition transmission of a wireless signal based on the RV sequence on the remaining resources except for at least one particular resource among the multiple resources configured S810. As one example, like the method described above, the UE may perform transmission (namely, initial transmission and/or repetition transmission) based on the RV sequence on the remaining resources (for example, resources except for the resources 705, 710, and 715 of FIG. 7) except for resources at particular positions.

Meanwhile, the UE may perform repetition transmission of a wireless signal on at least one particular resource among configured resources based on a redundancy version (RV) value pre-configured with respect to the at least one particular resource S815. As one example, like the method described above, the UE may perform transmission based on a particular RV value (namely, initial transmission and/or repetition transmission) on a resource at a particular position (for example, resources 705, 710, and 715 of FIG. 7).

Also, a pre-configured RV value may be derived by an index of at least one particular resource. Or, the pre-configured RV value may be a first element of the RV sequence. Or, the pre-configured RV value may be RV 0 or RV 3 with high self-decodability.

Also, as described above (for example, FIG. 7), an HARQ process ID may be mapped to each (or each transmission) of multiple resources based on the initial transmission position (namely, a resource on which the initial transmission is performed) of repetition transmission of a wireless signal. In this case, at least one particular resource may be a resource on which transmission based on the same HARQ process ID is performed regardless of timing of the initial transmission. At this time, the at least one particular resource may be determined by repetition number of repetition transmission of the wireless signal and indices of the multiple resources.

Here, the UE may receive configuration information on the repetition number through higher layer signaling from the base station.

Related to the description above, the corresponding UE may be implemented by an apparatus as shown in FIGS. 10 and 11. Considering this fact, the operation described with reference to FIG. 8 may be performed by the apparatus shown in FIGS. 10 and 11.

In other words, the processor 1021 (and/or the processor 1110) may receive a configuration of multiple resources for repetition transmission of a wireless signal semi-statically by the base station S805. Also, the processor 1021 (and/or the processor 1110) may perform repetition transmission of a wireless signal based on the RV sequence on the remaining resources except for at least one particular resource among the multiple resources configured S810. Also, the processor 1021 (and/or the processor 1110) may perform repetition transmission on at least one particular resource among configured resources based on a redundancy version (RV) value pre-configured with respect to the at least one particular resource S815.

FIG. 9 illustrates an operation flow diagram of a base station estimating a redundancy version for repetition transmission of a wireless signal according to the present disclosure. FIG. 9 is intended only for the convenience of descriptions and is not intended to limit the technical scope of the present disclosure.

Referring to FIG. 9, it is assumed that a UE and a base station select an RV value to be applied for transmission and estimate an RV value applied to the corresponding transmission based on the methods described above. Also, in the case of FIG. 9, it is assumed that the UE performs repetition transmission, and the base station estimates a redundancy version (RV) of the repetition transmission and receives the repetition transmission; however, the assumption is only an example, and the corresponding scheme may also be applied for the opposite case.

First, the base station may configure multiple resources of the UE for repetition transmission of a wireless signal semi-statically S905. In other words, the base station may transmit, to the UE, configuration information on multiple resources on which repetition transmission of a wireless signal is to be applied through a semi-static scheme (for example, higher layer signaling). In this case, a redundancy version (RV) sequence for repetition transmission of a wireless signal may be configured in advance.

Afterwards, the base station may estimate an RV for repetition transmission of a wireless signal based on the RV sequence from the remaining resources except for at least one particular resource among the multiple resources configured S910. As one example, like the method described above, the base station may estimate an RV for each transmission (namely, initial transmission and/or repetition transmission) based on the RV sequence from the remaining resources (for example, resources except for the resources 705, 710, and 715 of FIG. 7) except for resources at particular positions and perform reception of the repetition transmission.

Meanwhile, the base station may estimate an RV for repetition transmission of a wireless signal for at least one particular resource among configured resources based on a redundancy version (RV) value pre-configured with respect to the at least one particular resource S915. As one example, like the method described above, the base station may estimate an RV for transmission based on a particular RV value (namely, initial transmission and/or repetition transmission) from a resource at a particular position (for example, resources 705, 710, and 715 of FIG. 7) and perform reception of repetition transmission.

In this case, descriptions about the at least one particular resource, a pre-configured RV value, and an HARQ process ID are the same as given with reference to FIG. 8, detailed descriptions of which will therefore be omitted.

Related to the description above, the corresponding UE may be implemented by an apparatus as shown in FIG. 10. Considering this fact, the operation described with reference to FIG. 9 may be performed by the apparatus shown in FIG. 10.

In other words, the processor 1011 may configure multiple resources of the UE for repetition transmission of a wireless signal semi-statically S905. Also, the processor 1011 may estimate an RV for repetition transmission of a wireless signal based on the RV sequence from the remaining resources except for at least one particular resource among the multiple resources configured S910. Also, the processor 1011 may estimate an RV for repetition transmission of a wireless signal from at least one particular resource among configured resources based on a redundancy version (RV) value pre-configured with respect to the at least one particular resource S915.

According to the methods proposed by the present disclosure, an effect may be obtained that when a reception apparatus (for example, a base station or a terminal) is unable to determine a transmission time point of a transmission apparatus (for example, a terminal or a base station), the reception apparatus may determine an RV value used for transmission without receiving additional signaling of the transmission apparatus. In particular, an effect may be obtained that when a transmission apparatus uses repetition transmission, a reception apparatus may estimate part of RV values accurately from received transmissions even when the reception apparatus fails to receive part of repetition transmission (particularly, initial transmission) properly. Also, an effect may be obtained that when repetition number different from the length of a configured RV sequence is used, the corresponding RV sequence may be applied effectively.

Apparatus in General to Which the Present Disclosure May be Applied

FIG. 10 illustrates a block diagram of a wireless communication apparatus to which methods according to the present disclosure may be applied.

Referring to FIG. 10, a wireless communication system comprises a base station 1010 and a plurality of UEs 1020 located within the range of the base station 1010.

The base station 1010 comprises a processor 1011, a memory 1012, and a Radio Frequency (RF) unit 1013. The processor 1011 implements the functions, processes and/or methods described with reference to FIGS. 1 to 9. Layers of a wireless interface protocol may be implemented by the processor 1011. The memory 1012, being connected to the processor 1011, stores various kinds of information to operate the processor 1011. The RF unit 1013, being connected to the processor 1011, transmits and/or receives a radio signal.

The UE 1020 comprises a processor 1021, a memory 1022, and an RF unit 1023.

The processor 1021 implements the functions, processes and/or methods described with reference to FIGS. 1 to 9. Layers of a wireless interface protocol may be implemented by the processor 1021. The memory 1022, being connected to the processor 1021, stores various kinds of information to operate the processor 1021. The RF unit 1023, being connected to the processor 1021, transmits and/or receives a radio signal.

The memory 1012, 1022 may be installed inside or outside the processor 1011, 1021 and may be connected to the processor 1011, 1021 via various well-known means.

As one example, to transmit and receive downlink (DL) data in a wireless communication system supporting low latency services, the UE may include an RF unit for transmitting and receiving a wireless signal and a processor connected functionally to the RF unit.

Also, the base station 1010 and/or the UE 1020 may be equipped with a single antenna or multiple antennas.

FIG. 11 illustrates a block diagram of a communication apparatus according to one embodiment of the present disclosure.

In particular, FIG. 11 illustrates the UE of FIG. 10 in more detail.

Referring to FIG. 11, the UE may comprise a processor (or a Digital Signal Processor (DSP)) 1110, an RF module (or RF unit) 1135, a power management module 1105, an antenna 1140, a battery 1155, a display 1115, a keypad 1120, a memory 1130, a Subscriber Identification Module (SIM) card 1125 (this element is optional), a speaker 1145, and a microphone 1150. The UE may also include a single antenna or multiple antennas.

The processor 1110 implements the functions, processes and/or methods described with reference to FIGS. 1 to 9. Layers of a wireless interface protocol may be implemented by the processor 1110.

The memory 1130 is connected to the processor 1110 and stores information related to the operation of the processor 1110. The memory 1130 may be installed inside or outside the processor 1110 and may be connected to the processor 1110 via various well-known means.

The user enters command information such as a phone number by pushing (or touching) buttons of the keypad 1120 or voice activation using the microphone 1150. The processor 1110 receives such command information and processes the command information to perform an appropriate function such as calling the phone number. Operational data may be extracted from the SIM card 1125 or memory 1130. Also, the processor 1110 may display command information or operating information on the display 1115 for the user's attention and convenience.

The RF module 1135, being connected to the processor 1110, transmits and/or receives an RF signal. The processor 1110 delivers command information to the RF module 1135 to initiate communication, for example, to transmit a radio signal comprising voice communication data. The RF module 1135 comprises a receiver and a transmitter to receive and transmit a radio signal. The antenna 1140 performs a function of transmitting and receiving a radio signal. When receiving a radio signal, the RF module 1135 may deliver the signal to be processed by the processor 1110 and convert the signal into the baseband. The processed signal may be converted to audible signal output through the speaker 1145 or readable information.

The aforementioned embodiments are achieved by a combination of structural elements and features of the present disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the present disclosure may be achieved by various means, for example, hardware, firmware, software, or a combination thereof. In a hardware configuration, the methods according to the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present disclosure may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

INDUSTRIAL APPLICABILITY

Examples in which the method for transmitting and receiving the control information for paging in a wireless communication system according to the present disclosure has been applied to 3GPP LTE/LTE-A systems and 5G system (New RAT system) have been described, but the method may be applied to various wireless communication systems in addition to the 3GPP LTE/LTE-A systems and 5G system (New RAT system).

The invention claimed is:

1. In a method for performing repetition transmission of a wireless signal performed by a terminal in a wireless communication system, the method comprising:
receiving a configuration of multiple resources for repetition transmission of the wireless signal semi-statically from a base station;
wherein a redundancy version sequence for repetition transmission of the wireless signal is pre-configured,
performing repetition transmission of the wireless signal based on the redundancy version sequence on the remaining resources except for at least one particular resource among the multiple resources, and
performing repetition transmission of the wireless signal on the at least one particular resource based on a redundancy version value pre-configured for the at least one particular resource.

2. The method of claim 1, wherein the pre-configured redundancy version value is derived by an index of the at least one particular resource.

3. The method of claim 1, wherein a Hybrid Automatic Repeat and reQuest (HARQ) process identifier is mapped to each of the multiple resources based on an initial transmission position of repetition transmission of the wireless signal.

4. The method of claim 3, wherein the at least one particular resource is a resource on which transmission based on the same HARQ process identifier is performed regardless of timing of the initial transmission.

5. The method of claim 4, wherein the at least one particular resource is determined by repetition number of repetition transmission of the wireless signal and indices of the multiple resources.

6. The method of claim 5, wherein configuration information on the repetition number is received through higher layer signaling from the base station.

7. The method of claim 4, wherein the pre-configured redundancy version value is a first element of the redundancy version sequence.

8. The method of claim 4, wherein the pre-configured redundancy version value is redundancy version 0 (RV 0) or redundancy version 3 (RV 3).

9. In a method for a base station to estimate redundancy version of repetition transmission of a wireless signal performed by a terminal in a wireless communication system, the method comprising:
configuring multiple resources of the terminal for repetition transmission of the wireless signal semi-statically;
wherein a redundancy version sequence for repetition transmission of the wireless signal is pre-configured,
estimating, based on the redundancy version sequence, a redundancy version for repetition transmission of the wireless signal from the remaining resources except for at least one particular resource among the multiple resources, and
estimating a redundancy version for repetition transmission of the wireless signal from the at least one particular resource based on a redundancy version value pre-configured for the at least one particular resource.

10. The method of claim 9, wherein the pre-configured redundancy version value is derived by an index of the at least one particular resource.

11. The method of claim 9, wherein a Hybrid Automatic Repeat and reQuest (HARQ) process identifier is mapped to each of the multiple resources based on an initial transmission position of repetition transmission of the wireless signal.

12. The method of claim 11, wherein the at least one particular resource is a resource on which transmission based on the same HARQ process identifier is performed regardless of timing of the initial transmission.

13. The method of claim 12, wherein the at least one particular resource is determined by repetition number of repetition transmission of the wireless signal and indices of the multiple resources.

14. The method of claim 13, wherein configuration information on the repetition number is received through higher layer signaling from the base station.

15. In a terminal performing repetition transmission of a wireless signal in a wireless communication system, the terminal comprising:
a transceiver for transmitting and receiving a wireless signal; and
a processor connected functionally to the transceiver, wherein the processor is configured to:
receive a configuration of multiple resources for repetition transmission of the wireless signal semi-statically from a base station;

wherein a redundancy version sequence for repetition transmission of the wireless signal is pre-configured, perform repetition transmission of the wireless signal based on the redundancy version sequence on the remaining resources except for at least one particular resource among the multiple resources, and perform repetition transmission of the wireless signal on the at least one particular resource based on a redundancy version value pre-configured for the at least one particular resource.

* * * * *